Oct. 12, 1943.                W. GRUND                2,331,389
EXPANSION JOINT
Filed March 20, 1942            2 Sheets-Sheet 1
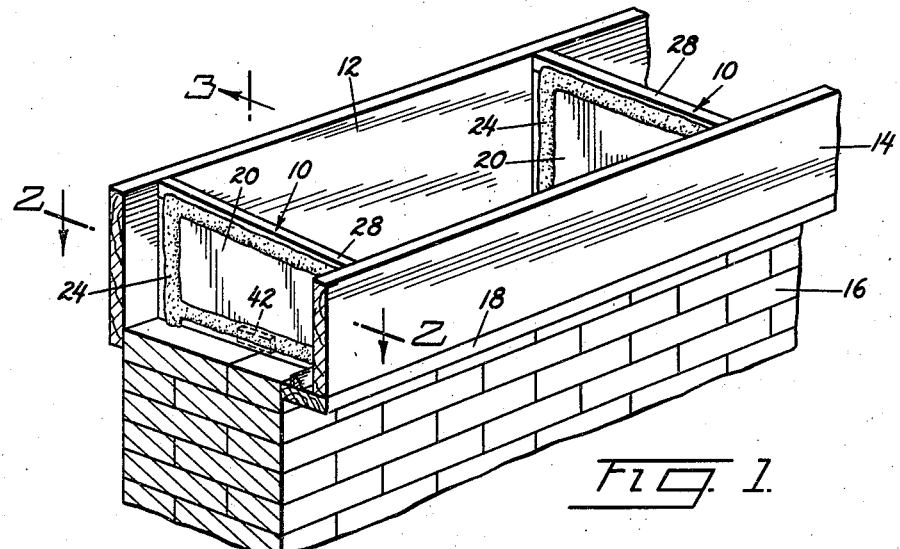
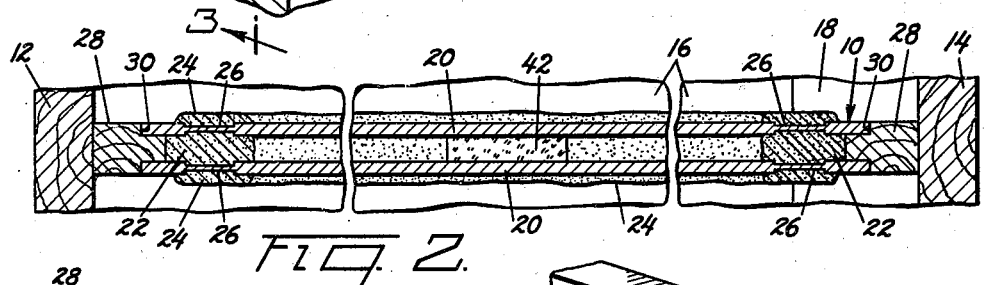
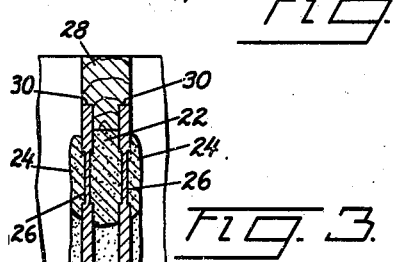
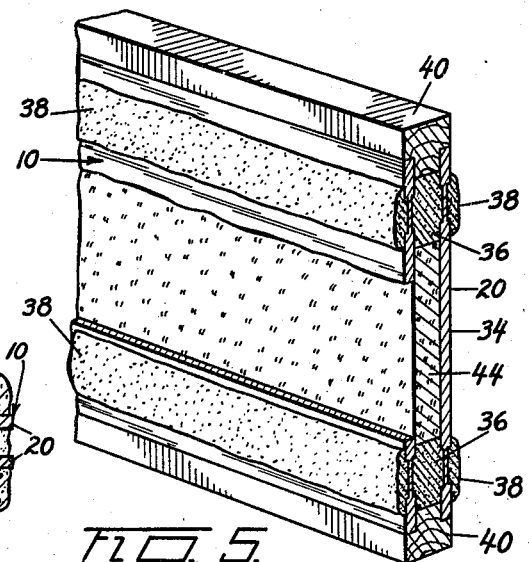
INVENTOR.
William Grund
BY
Parker & Benton
ATTORNEYS Oct. 12, 1943.  W. GRUND  2,331,389
EXPANSION JOINT
Filed March 20, 1942  2 Sheets-Sheet 2
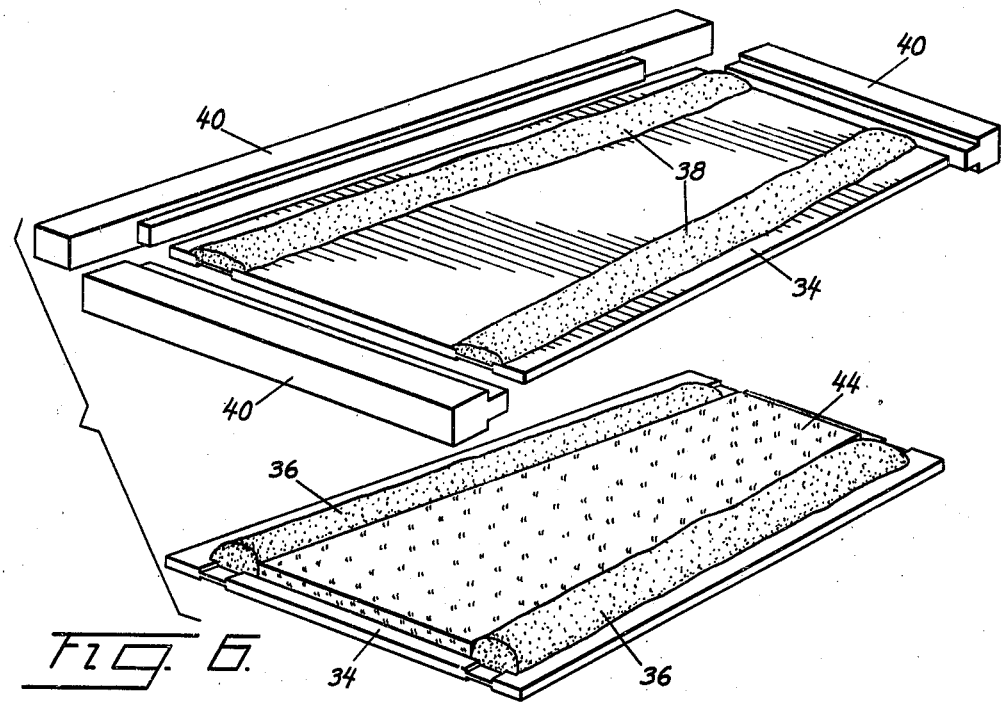
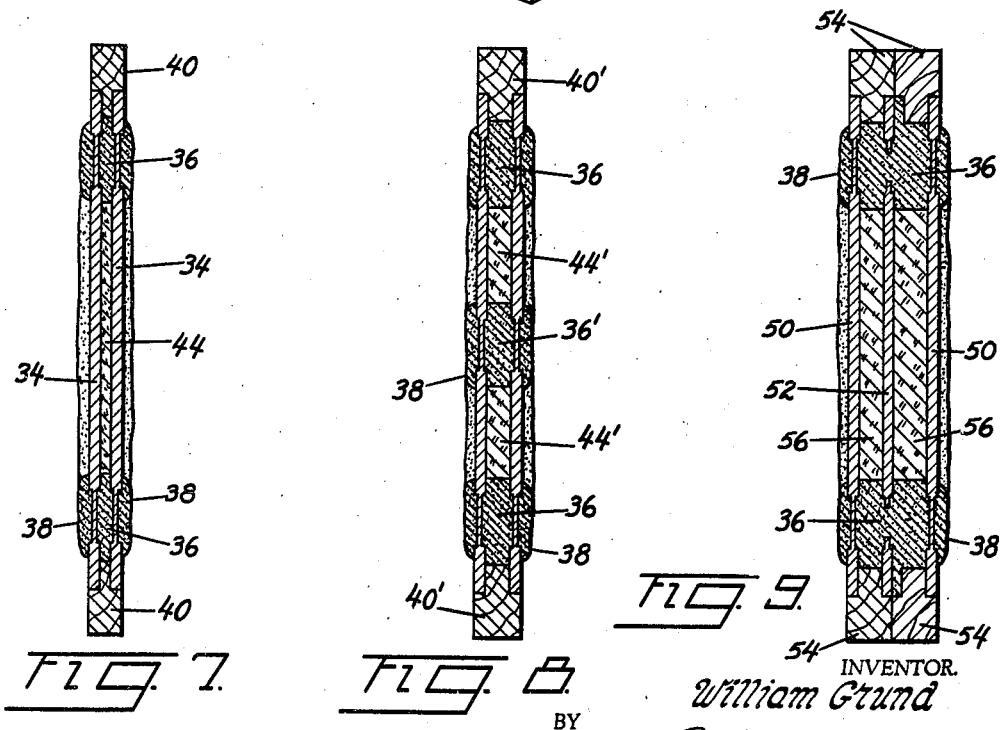
INVENTOR.
William Grund
BY Parker & Benton
ATTORNEYS Patented Oct. 12, 1943

2,331,389

UNITED STATES PATENT OFFICE 2,331,389

EXPANSION JOINT

William Grund, Detroit, Mich.

Application March 20, 1942, Serial No. 435,501

8 Claims. (Cl. 72—106)

My invention relates to expansion joints for use between structural units and particularly to an expansion joint constituting an improvement over the type of joint described and claimed in my Patent, 2,290,424, issued July 21, 1942, filed March 28, 1938, and my Patent 1,990,323, dated February 5, 1935.

In my copending application I have described an expansion joint particularly adapted for use between poured concrete units. The present invention has to do with improvements in this type of joint and provides a joint which is economical to manufacture, accurately made to size and insures a moisture proof joint under all conditions of expansion and contraction.

More particularly, it is an important object of this invention to provide means in the joint which speeds up the manufacturing process by bringing the parts quickly into proper spaced relation and normally maintaining them in this desired spaced condition, yet being compressible under forces of expansion to allow reduction in the thickness of the joint. The means described is an element of the combination which has been added to the joint described in my copending application and is interposed between two parallel panels. It is arranged in such position prior to the complete assembly of the panels and is made in various predetermined thicknesses in order to space the panels the proper amount to form a joint of the desired width. The element is composed of resiliently compressible material yieldable to heavy compression forces such as that encountered when the joint is subject to the forces of expansion of the structural units between which it is placed.

A further object of this invention is to provide an improved expansion of the type described wherein the parts are compactly assembled and so related to one another that the element previously referred to is disposed in a novel position between bodies or strips of plastic gasket material.

Another object of the invention is to provide a novel type of wide expansion joint formed of parts which extend the joint to the precise thickness desired yet form a positive barrier to the penetration of moisture.

Various other objects, advantages and meritorious features will come more fully apparent from the following specification, appended claims and accompanying drawings, wherein:

Figure 1 is a perspective view of a form for pouring concrete copings and the like and showing the location of one type of expansion joint embodying the invention, Fig. 2 is a horizontal sectional view through the expansion joint along lines 2—2 of Fig. 1, Fig. 3 is a vertical sectional view along lines 3—3 of Fig. 1, Fig. 4 is an enlarged detail view of the joint showing the construction after the structural units have been cast, Fig. 5 is a perspective view of a section of an elongated expansion joint particularly adapted for use between sidewalks, pavement, and other similar types of structural units, Fig. 6 is an exploded view illustrating the method of assembling the parts of the expansion joint, Fig. 7 is a sectional view through an embodiment of the invention illustrating one thickness of joint, Fig. 8 is a similar sectional view through another joint of a wider thickness, and Fig. 9 is a sectional view through an extra wide joint employing three parallel panel like elements.

In Fig. 1, expansion joints constructed in accordance with this invention are shown generally at 10 disposed in spaced relation in a form for casting concrete coping units or blocks along the top of a building wall. The joints may be modified and used with different types of forms. The joints are usually supported in upright position and as evident serve as barriers to the flow of plastic material, such as concrete, which is poured into the forms. The form illustrated in Figs. 1 and 2 comprises spaced parallel side members 12 and 14 disposed along opposite sides of the top of the brick wall 16. A bottom form member 18 may be provided to form an overhang on the coping blocks after they have hardened. If necessary, small amounts of the plastic material may be packed around the base of the joints to support them in upright position.

As described in my copending application, each joint 10 comprises in general two or more panel-like members 20—20 of substantially the same dimensions arranged in parallel slightly spaced apart relationship with the edges substantially even or flush with one another. Preferably these panels are constructed of relatively stiff material which is moisture-proof, rust-proof and rot-proof. A compound 22 of a plastic nature is interposed between the panels and yieldingly spaces these panels from one another. This compound may be of the character described in my Patent 1,990,323, hereinabove mentioned. This compound is preferably formed by heavy bodied material having elastic-adhesive water resisting qualities which secures the two panels 20—20 into a unitary structure. On the outside faces of the panels similar adhesive plastic material 24 is positioned. As described and claimed in my copending application it is preferable to form the plastic material in continuous strips or ribbons and locate these strips adjacent to but slightly spaced from the edges of the panels. These strips function as gaskets preventing the leakage of moisture past either side of the panels.

The panels are shaped as also described and claimed in my copending application with channels 26 which receive the gasket strips and act to hold the same against displacement. The channels on each face of the panel are located opposite the channels on the opposite face. The channels 26 are relatively shallow and the gasket material projects beyond the faces as shown. Expansion joints for copings are relatively wider and preferably both the gasket strips and the channels extend around four sides of the joint as illustrated.

Means which is described and claimed in my copending application is provided for temporarily sealing the edges of the joints. This means comprises elongated elements or plugs 28 which are shaped to partially enter the marginal spaces between the panels. The plugs serve to prevent the plastic material which is poured into the forms from flowing around the edges of the panels and into the spaces between the panels. After the plastic material such as concrete hardens and takes a permanent set, the sealing plugs are removed. As shown each sealing plug is longitudinally shouldered on opposite sides at 30 so that the plug may rest on the edges of the panels. The sealing elements are therefore divided into two sections, a narrow section which enters between the panels and a wider section which projects and overlies the margins of the panels. The latter section is preferably made wide enough so that its sides extend flush with the outside faces of the panels upon which it rests. The sealing plugs are preferably made of rigid material, such as wood. After the concrete has hardened, they are removed and the exposed crevice left by their removal is filled with caulking material such as that indicated at 32 in Fig. 4. Also shown in this figure are the two structural or concrete units 33—33 between which the joint is formed. The concrete has bonded to the outside faces of the panels and the outside strips of gasket material.

Illustrated in Fig. 5 is a modification of the expansion joint especially suitable for structural units of small height such as concrete floors and the like. For such use the joint is long and narrow. It comprises the elements heretofore described except for changes in dimension. The two panels 34—34 carry inside gasket material 36 and outside gasket material 38 which is arranged in continuous strips adjacent the longitudinal edges of the joint. Along these edges extend sealing elements 40—40 formed and assembled on the joint in the manner previously described.

In both modifications a novel feature is provided which accurately spaces the panels apart yet under the forces of expansion will allow the panels to move toward one another. Building specifications call for expansion clearances of various definite widths. The expansion joint selected should retain its width even when subject to the pressure of the plastic or concrete material before it hardens. Incorporated in the assembled joint is a novel element which functions to space the panels apart the desired distance and hold them in such positions except when subject to the strong forces of expansion of the structural units between which it is placed. This element is preferably in the form of a flat sheet of material of a thickness that it will space the panels the desired distance apart. This material is such that when subjected to strong opposing forces it compresses to a narrower width. Thus when the units between which the joint is placed expand, the compressible element will yield to allow movement of the panels toward one another. Normally, however, the sheet like element will hold the panels to the desired spaced relation.

The material forming the novel spacing means is preferably corkboard, but possible alternatives are soft pine or cedar. The corkboard or other similar sheet material utilized in the joint assembly shown in Figs. 1, 2 and 3 is indicated at 42. In the modification illustrated in Fig. 5 it takes the form of an elongated strip 44 occupying substantially the whole space between the two ribbons of gasket material 36—36. As noted the corkboard elements are located generally remote from the wooden sealing plugs. The plugs will maintain the marginal portions in spaced apart relation during the casting and hardening operations but unsupported mid-sections of the panels are likely to give in. Thus it will be seen that the corkboard sheets are usually disposed on sides of the inside gasket material opposite to the sealing plugs.

The spacer elements 42 and 44 contribute in a novel way to accurately space the panels apart. The spacer elements are interposed between the panels before they are brought together and bonded to one another by the adhesive gasket material. Thus by selecting a spacer element of a given width it is possible to predetermine the transverse dimension of the joint from the outside faces of the panels. Fig. 6 illustrates the preferred method of manufacture. One of the two panel members of the joint, such as 34 of the type illustrated in Fig. 5, is laid flat upon a support. A strip of corkboard or like material 44 is laid upon the panel lengthwise thereof and between the channels in which the gasket material is received. Gasket material 36 is deposited in the channels of the panel along either side of the corkboard. This material will rise to a height greater than the corkboard. The second panel of the joint is superimposed above the first and pressed down upon the corkboard. Sufficient pressure is exerted to cause the gasket material to give way until facial contact is made between the last member and the corkboard. The adhesive quality of the gasket material will bond the two panels together. Under normal pressures the corkboard strip regulates the minimum distance the panels may be spaced apart. Either prior to or following this last described operation, the sealing plugs 40 may be introduced. If prior the flange of the plug may be rested on the margin of the lower panel.

Figs. 7 and 8 illustrate how the thickness of the corkboard spacer will dispose the panels at various distances apart. In Fig. 7 a spacer member 44 of narrow width has been selected which forms a joint of rather narrow width. In Fig. 8, a modified type of joint is shown employing relatively wide corkboard spacer elements. As shown, the joint is provided with a central gasket strip 36' paralleling the two marginal strips 36. Between these gasket strips extend corkboard spacers 44', which because of their relatively thick character form wide joints.

In Fig. 9 there is illustrated a novel type of extremely wide type of joint. It comprises three panel members arranged in parallel side by side relation but spaced from one another by spacer means previously described and the gasket material. Extending along one or more marginal portions of the joint is a dual form of sealing means which cooperate to prevent inflow of concrete during the casting of the units between which the joint is placed. The joint comprises the two outside panels 50—50 and a central panel 52. The outside panels are similarly formed and are like those described in connection with Figs. 2, 5 and 7. All three panels are preferably provided with channels which extend opposite one another for receiving the gasket material. At spaced intervals the central panel 52 is provided with apertures in its channels enabling the gasket material to extend through the apertures and integrally join with the material on the faces of the panels.

Extending along one or more of the edges of the joint are two sealing plugs 54—54 which are similarly formed with narrow sections or tongues which enter between the panels and wider sections which project beyond the panels. The construction is such, as shown in Fig. 9, that the wider sections of the plug elements abut one another throughout their length and effectively seal the spaces between the panels. The shoulders formed by the two sections of each plug element rest on the edges of the panels.

As in the previously described modifications, the joint is provided with compressible spacer means in the form of corkboard sheets or the like 56. These sheets are disposed between each outside panel 50 and the middle panel 52 and between the strips of gasket material. The joint is especially adapted where large clearances are desired between structural units. In such cases the present modification of the invention extends from one face of the structural unit to the other and because of the provision and character of the gasket material prevent ingress of moisture while varying in thickness to accommodate the expansion and contraction of the units. As in the previous described joints the sealing plugs 54—54 are removed after the plastic material forming the structural units has hardened, and the crevice exposed thereby is caulked over in a manner like that shown in Fig. 4.

What I claim:

1. An expansion joint comprising, in combination, a pair of panels of substantially the same size and arranged in parallel relationship with their edges substantially even, elastic adhesive gasket material between said panels extending in a continuous strip adjacent to but slightly spaced from one edge of the panels and bonding the two panels together into a unitary device, a relatively rigid member removably positioned between the marginal portions of said edge of the panels, and a compressible spacer member between said panels occupying a space free of said gasket material and adjacent thereto on the side opposite the removable relatively rigid member, said compressible member normally acting to maintain said panels in spaced relation but being compressible to allow movement of the panels toward one another when the joint is disposed between structural units and is subjected to forces of expansion thereof.

2. An expansion joint comprising, in combination, a pair of relatively rigid panels of substantially the same size and arranged in parallel relation with their respective edges substantially even with one another said two panels correspondingly recessed on both faces extending along and spaced from one margin, plastic material of elastic adhesive characteristics disposed between said panels within said inner recesses and bonding the two together into a unitary structure, plastic gasket material of elastic adhesive characteristics carried on the outside surfaces of said panels within said outer recesses, and a spacer member between said panels on the side of said plastic material opposite said margin of the panels, said spacer member being resistingly compressible and normally maintaining said panels in a given spaced apart relation but compressible to allow movement of the panels toward one another when the joint is disposed between structural units and subjected to strong forces of expansion thereof.

3. An expansion joint comprising, in combination, a pair of panels of substantially the same size and arranged with the edges extending substantially even with one another, spaced strips of plastic gasket material of elastic adhesive characteristics disposed between said panels and bonding the two together into a unitary device, said strips extending along but spaced from opposite margins of the pair of panels, and a spacer member between said panels extending across the space between said strips normally spacing said panels apart so that they have a predetermined transverse dimension, said spacer member being resistingly compressible to allow movement of said panels toward one another when the joint is disposed between a pair of structural units and subject to the forces of expansion of the latter.

4. An expansion joint for use between structural units comprising, in combination, a pair of relatively stiff thin flat members of substantially the same size arranged with their edges substantially flush with one another, heavy bodied material of elastic adhesive water-resisting qualities positioned between said members securing the same together into a unitary device yet yieldingly maintaining the members in slightly spaced apart relationship, said material arranged in two unbroken continuous strips adjacent but slightly spaced from opposite edges of the members, heavy bodied material of similar characteristics secured to the outer surfaces of said members in strips opposite said two first mentioned strips, an elongated element of relatively rigid material removably received between one pair of said corresponding edges, and a compressible element between said members on the side of said strip of heavy bodied material opposite to said relatively rigid element and cooperating therewith to hold the members from collapse upon one another but being sufficiently compressible that after removal of the relatively rigid element it will resistingly allow movement of said members toward one another under the forces of expansion of the structural units between which the joint is placed.

5. An expansion joint for use between structural units comprising, in combination, a pair of relatively stiff thin flat members of substantially the same size arranged with their edges substantially flush with one another, heavy bodied material of elastic adhesive water-resisting qualities positioned between said members securing the same together into a unitary device yet yieldingly maintaining the members in slightly spaced apart relationship, said material arranged in an unbroken continuous strip adjacent but slightly spaced from corresponding edges of the members and extending continuously along the perimeter thereof, heavy bodied material of similar characteristics secured to the outer surfaces of said members opposite said strip, and a compressible element between said members on the side of said strip opposite the margins of said members and filling the space defined by said strip and adapted to hold the members from collapse upon one another, said compressible element being of sufficient strength to resist normal forces tending to collapse said members together but resistingly allowing the members to move toward one another when subjected to forces of expansion of the structural units between which the joint is placed.

6. An expansion joint comprising, in combination, a pair of elongated panels of substantially the same size and arranged side by side in parallel slightly spaced apart relation with their edges substantially even with one another, a strip of plastic adhesive material between the panels adjacent to but slightly spaced from each longitudinal edge of the panels and acting together to bond the two panels together into a unitary structure and forming a continuous unbroken strip, a removable member of relatively rigid material extending along at least one of the two longitudinal edges and shaped to enter between the panels in the space between the edge and the adjacent strip of plastic material, and an elongated spacer member between said panels and within the space defined by said continuous strip of plastic material normally acting to maintain said panels in a predetermined spaced apart relation, said spacer member being resistingly compressible and adapted when the joint is disposed between structural units to allow movement of the panels toward one another when subject to the forces of expansion of the structural units.

7. An expansion joint comprising, in combination, a pair of outside panels of substantially the same size arranged in parallel spaced apart relationship with the edges substantially flush with one another, a third panel disposed between said outside panels and in spaced parallel relation thereto, a strip of plastic adhesive material arranged along corresponding positions on opposite sides of said third panel spaced from a margin thereof bonding the outside panels thereto, and a pair of rigid elongated spacer members arranged along one edge of said panels and each removably disposed between one of said outside panels and said third panel overlapping said outside panel margins and abutting each other adjacent said third panel and filling the space between the margins of said panels and the strip of plastic bonding material.

8. An expansion joint comprising, in combination, three or more relatively rigid panels of substantially the same size arranged parallel to one another in spaced apart relation and with at least one of their edges substantially even with one another, strips of plastic material of elastic adhesive characteristics interposed between said panels bonding one to the other and extending adjacent to but slightly spaced from one of the substantially even edges of the panels, spacer members between adjacent panels adjacent said strips opposite the outer margin of the panels acting to normally maintain the panels in the desired spaced relationship, said spacer members being resistingly compressible to allow movement of the panels toward one another when subject to expansion of the structural units between which the joint is placed, and a plurality of elongated sealing members each removably received between marginal portions of said edges adjacent to which said strips of plastic material extend cooperating with the spacer members to position said panels apart.

WILLIAM GRUND.